(12) United States Patent
Bobier et al.

(10) Patent No.: US 9,365,764 B2
(45) Date of Patent: Jun. 14, 2016

(54) SLICKWATER FRACTURING FLUID

(71) Applicant: Calfrac Well Services Ltd., Calgary (CA)

(72) Inventors: Dwight Bobier, Calgary (CA); Ronald Pierce, Vancouver (CA)

(73) Assignee: CALFRAC WELL SERVICES LTD., Calgary, AB (CA)

( * ) Notice: Subject to any disclaimer, the term of this patent is extended or adjusted under 35 U.S.C. 154(b) by 437 days.

(21) Appl. No.: 13/711,008

(22) Filed: Dec. 11, 2012

(65) Prior Publication Data
US 2013/0153234 A1 Jun. 20, 2013

(30) Foreign Application Priority Data
Dec. 15, 2011 (CA) ..................... 2762457

(51) Int. Cl.
*C09K 8/68* (2006.01)
*C09K 8/60* (2006.01)

(52) U.S. Cl.
CPC .. *C09K 8/68* (2013.01); *C09K 8/602* (2013.01)

(58) Field of Classification Search
None
See application file for complete search history.

(56) References Cited

U.S. PATENT DOCUMENTS

| 7,741,252 | B2 | 6/2010 | Chen et al. | |
|---|---|---|---|---|
| 2006/0124309 | A1* | 6/2006 | Nguyen | C09K 8/508 166/308.2 |
| 2009/0281004 | A1 | 11/2009 | Ali et al. | |
| 2009/0281012 | A1 | 11/2009 | Trivedi et al. | |
| 2011/0071058 | A1 | 3/2011 | Howard et al. | |
| 2011/0136704 | A1* | 6/2011 | Sharma | C09K 8/584 507/205 |

* cited by examiner

*Primary Examiner* — John J Figueroa
(74) *Attorney, Agent, or Firm* — Welsh Flaxman & Gitler LLC

(57) ABSTRACT

Described is a slickwater fracturing fluid containing base water having up to 300,000 ppm total dissolved solids; a viscosifier; a scale inhibitor; and a surfactant composition. The surfactant composition contains at least one dibasic ester, at least one non-ionic surfactant, at least one terpene or terpene derivative and optionally at least one polyalkylene glycol.

18 Claims, 1 Drawing Sheet

SLICKWATER FRACTURING FLUID

BACKGROUND

The present application is directed to slickwater fracturing fluids, methods of preparing them and their use for the hydraulic fracturing of hydrocarbon-producing subterranean formations.

Fracturing fluids are used in the process of hydraulic fracturing to facilitate the recovery of hydrocarbon deposits within a subterranean formation. Fracturing fluid is generally pumped into the formation at high pressure so as to force the opening of cracks or fissures within the formation, allowing hydrocarbons to flow more easily from the formation. Fracturing fluids often contain large amounts of water, although methanol or hydrocarbons such as diesel, or liquefied propane or methane can also be used. Often, fracturing fluids contain a suspended granular solid or proppant which remains in the formation once the fracturing fluid has been removed, where the proppant acts to prop open the channels which are formed. Fracturing fluids often also contain additives to control the viscosity and other properties of the fluids so that adequate quantities of proppant can remain suspended while the fluid is being pumped into the formation, but the proppant can be deposited within the cracks and fissures formed downhole and the remaining components can be readily removed from the fractured formation. Such additives can include gelling agents to increase viscosity, facilitating the suspension of proppant for transport into the formation, and breakers to reduce viscosity, thereby allowing proppant to be deposited in the fractures and facilitating the recovery of used fracturing fluid. However, some fracturing fluid additives are toxic or can cause harm to the environment.

Slickwater fracturing systems are used especially for stimulation of highly pressurized deeper shale formations, and are generally water-based fluids containing friction-reducing agents so that large volumes of fluid can be pumped rapidly through the wellbore and into the formation. Slickwater fracturing fluids often have reduced viscosity compared to other fracturing fluid systems, and therefore lower concentrations of proppant are often used so that the proppant can remain suspended to be carried downhole. Because of the large volumes of water involved, slickwater systems can pose environmental challenges, both with regard to disposal of flowback water and with regard to possible contamination of the adjacent aquifer by fluid remaining in the formation after fracturing. Recently, environmentally friendly slickwater compositions have been described in US Patent Application Publication No. 2011/0071058 and U.S. Pat. No. 7,741,252.

Therefore, there is a need for a slickwater fracturing system that addresses one or more of the disadvantages of, or provides an alternative to, present slickwater systems.

SUMMARY

In one aspect, the present application is directed to a slickwater fracturing fluid containing base water; a viscosifier; a scale inhibitor; and a surfactant composition. The base water can contain up to 300,000 ppm total dissolved solids. The surfactant composition contains at least one dibasic ester, at least one non-ionic surfactant, at least one terpene or terpene derivative and optionally at least one polyalkylene glycol.

Another aspect of the present application is directed to a method of fracturing a subterranean formation comprising pumping a slickwater fracturing fluid as described herein into the subterranean formation.

BRIEF DESCRIPTION OF THE DRAWINGS

Further features of the present invention will become apparent from the following written description and the accompanying figures, in which.

DETAILED DESCRIPTION OF THE INVENTION

Figure 1:
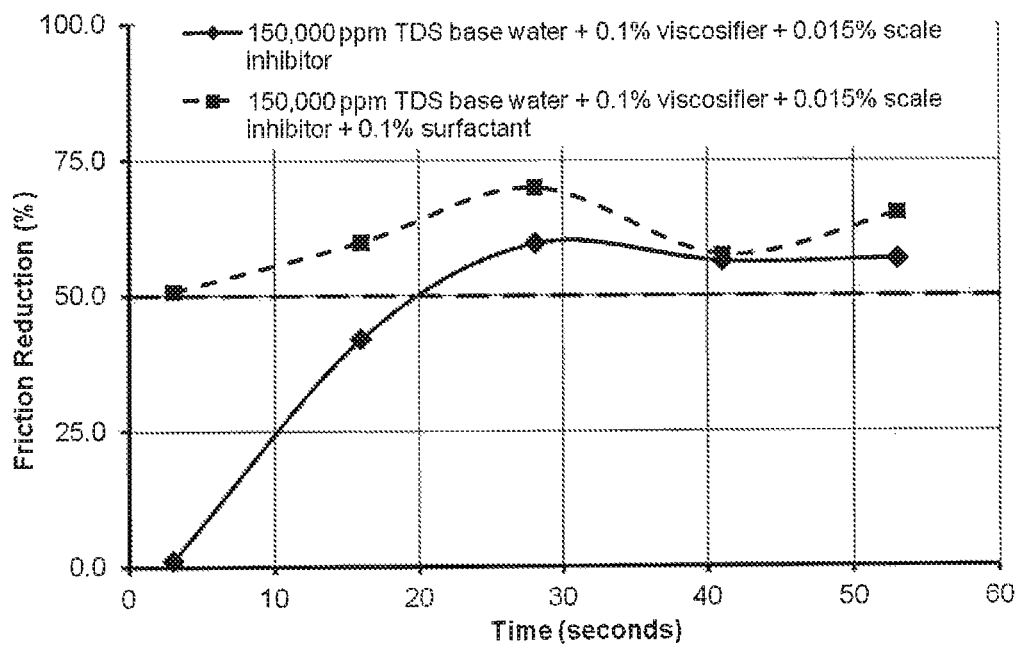
FIG. 1 is a chart showing the friction reduction observed for one embodiment of the present slickwater fracturing fluid containing base water containing 150,000 ppm total dissolved solids (TDS)

The present slickwater fracturing fluid contains base water containing up to 300,000 ppm total dissolved solids; a viscosifier; a scale inhibitor; and a surfactant composition containing at least one dibasic ester, at least one non-ionic surfactant, at least one terpene or terpene derivative and optionally at least one polyalkylene glycol. In at least one embodiment, the slickwater fracturing fluid contains about 0.02% to about 0.5% by volume of the viscosifier; about 0.01% to about 0.5% by volume of the scale inhibitor; and about 0.05% to about 0.5% by volume of the surfactant composition. In at least one embodiment, the water which forms the base of the present slickwater fracturing fluid can contain up to 300,000 ppm of total dissolved solids. In at least one embodiment, the base water containing up to 300,000 ppm total dissolved solids can be water obtained from supply water sources well known to the skilled person, including but not limited to flowback water, recycled water, brine and produced water.

In at least one embodiment, the viscosifier is a polyacrylamide viscosifier. The polyacrylamide viscosifier can be added to the slickwater fracturing fluid as a solid or as a liquid emulsion. In at least one embodiment, the polyacrylamide viscosifier is cationic. Suitable cationic polyacrylamides are well known in the art and include but are not limited to copolymers of acrylamide or methacrylamide with monomers bearing cationic substituents, including but not limited to trialkylammonium substituents. In at least one embodiment, the cationic polyacrylamide is in the form of a liquid emulsion in a biodegradable mineral oil. In at least one embodiment, the liquid emulsion of the cationic polyacrylamide in a biodegradable mineral oil contains a biodegradable surfactant. In at least one embodiment, the biodegradable surfactant is a biodegradable linear alcohol. In at least one embodiment, the cationic polyacrylamide is in the form of a solid powder.

In at least one embodiment, the scale inhibitor is an anionic polyacrylate, including but not limited to sodium polyacrylate. In at least one embodiment, the anionic polyacrylate has a molecular weight between about 1500 daltons and about 15,000 daltons. In at least one embodiment, the anionic polyacrylate is in the form of a liquid or in the form of a concentrated aqueous solution. Suitable anionic polyacrylates are well known in the art and are useful for preventing scale formation and buildup in the presence of salts containing cations including but not limited to magnesium, calcium, barium, strontium, and/or iron cations. Such salts can be present in the formation to be fractured, and/or in the base water containing up to 300,000 ppm total dissolved solids.

In at least one embodiment, the surfactant composition contains at least one dibasic ester, at least one non-ionic surfactant, at least one terpene or terpene derivative and optionally at least one polyalkylene glycol. In at least one embodiment, the surfactant composition contains about 30% to about 60% by weight of the at least one dibasic ester, about 30% to about 60% by weight of the at least one non-ionic surfactant, about 1% to about 15% by weight of the at least one terpene or terpene derivative and no more than 5% by weight of the at least one polyalkylene glycol.

In at least one embodiment, the at least one dibasic ester has the structural formula:

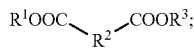

wherein $R^1$ and $R^3$ are each independently selected from $(C_{1-20})$alkyl, $(C_{3-10})$cycloalkyl, aryl, $(C_{1-12})$alkylaryl and aryl $(C_{1-12})$alkyl; and $R^2$ is $-(CH_2)_p-$, wherein p is an integer from 2 to 7, and wherein the $-(CH_2)_p-$ group is optionally substituted with from 1 to 3 $(C_{1-3})$alkyl groups.

In at least one embodiment, $R^1$ and $R^3$ are each independently a $(C_{1-12})$alkyl group. In at least one embodiment, $R^1$ and $R^3$ are each independently a $(C_{1-8})$alkyl group. In at least one embodiment, $R^1$ and $R^3$ are each independently a $(C_{1-6})$ alkyl group. In at least one embodiment, $R^1$ and $R^3$ are each independently selected from methyl, ethyl, propyl, 1-methylethyl, butyl, 2-methylpropyl, pentyl, 3-methylbutyl, hexyl, cyclohexyl, heptyl, octyl and 2-ethylhexyl. In at least one embodiment. $R^1$ and $R^3$ are each independently selected from methyl, ethyl, propyl, 1-methylethyl, butyl, 2-methylpropyl, pentyl and 3-methylbutyl. In at least one embodiment, $R^1$ and $R^3$ are each independently selected from a hydrocarbon group originating from an alcohol found in fusel oil. In at least one embodiment. $R^2$ is $-(CH_2)_p-$, wherein p is 2, 3 or 4, and the $-(CH_2)_p-$ group is optionally substituted with from 1 to 3 $(C_{1-3})$alkyl groups.

In at least one embodiment, the at least one dibasic ester is selected from one or more of a di$(C_{1-8})$alkyl succinate, a di$(C_{1-8})$alkyl glutarate, a di$(C_{1-8})$alkyl adipate, and a mixture thereof, each of which can be further substituted on the succinate, glutarate or adipate portions with from 1 to 3 $(C_{1-3})$ alkyl groups. In at least one embodiment, the at least one dibasic ester is selected from one or more of a di$(C_{1-6})$alkyl ethylsuccinate, a di$(C_{1-6})$alkyl methylglutarate, a di$(C_{1-6})$ alkyl adipate, and a mixture thereof. In at least one embodiment, the at least one dibasic ester is selected from one or more of a dimethyl ethylsuccinate, a diethyl ethylsuccinate, a dimethyl methylglutarate, a diethyl methylglutarate, a dimethyl adipate, a diethyl adipate, and a mixture thereof. In at least one embodiment, the at least one dibasic ester is selected from one or more of dimethyl ethylsuccinate, diethyl ethylsuccinate, dimethyl 2-methylglutarate, diethyl 2-methylglutarate, dimethyl 3-methylglutarate, diethyl 3-methylglutarate, dimethyl adipate, diethyl adipate, and a mixture thereof. In at least one embodiment, the at least one dibasic ester is dimethyl 2-methylglutarate.

The term "substituent", as used herein and unless specified otherwise, is intended to mean an atom, radical or group which may be bonded to a carbon atom, a heteroatom or any other atom which may form part of a molecule or fragment thereof, which would otherwise be bonded to at least one hydrogen atom. Substituents contemplated in the context of a specific molecule or fragment thereof are those which give rise to chemically stable compounds, such as are recognized by those skilled in the art.

The terms "alkyl" or "$(C_{1-n})$alkyl" wherein n is an integer, as used herein and unless specified otherwise, either alone or in combination with another radical, are intended to mean an acyclic, straight or branched chain, saturated alkyl radical containing from 1 to n carbon atoms, wherein n is an integer. "Alkyl" includes, but is not limited to, methyl, ethyl, propyl (n-propyl), butyl(n-butyl), 1-methylethyl(iso-propyl), 1-methylpropyl(sec-butyl), 2-methylpropyl(iso-butyl), 1,1-dimethylethyl(tert-butyl), pentyl(n-pentyl), hexyl(n-hexyl), octyl (n-octyl), decyl(n-decyl), isodecyl(8-methylnonyl), dodecyl (n-dodecyl), and tetradecyl(n-tetradecyl).

The terms "cycloalkyl" or "$(C_{3-m})$cycloalkyl" wherein m is an integer, as used herein and unless specified otherwise, either alone or in combination with another radical, are intended to mean a saturated cycloalkyl substituent containing from 3 to m carbon atoms, wherein m is an integer, and includes, but is not limited to, cyclopropyl, cyclobutyl, cyclopentyl, cyclohexyl and cycloheptyl.

The term "aryl" as used herein and unless specified otherwise, either alone or in combination with another radical, is intended to mean a carbocyclic aromatic monocyclic group containing 6 carbon atoms which may be further fused to one or more 5- or 6-membered carbocyclic groups, each of which may be aromatic, saturated or unsaturated. "Aryl" includes, but is not limited to, phenyl, indanyl, indenyl, 1-naphthyl, 2-naphthyl, tetrahydronaphthyl and dihydronaphthyl.

The terms "arylalkyl" or "aryl$(C_{1-n})$alkyl" wherein n is an integer, as used herein and unless specified otherwise, either alone or in combination with another radical, are intended to mean a saturated, acyclic alkyl radical having 1 to n carbon atoms as defined above which is itself substituted with an aryl radical as defined above. Examples of arylalkyl include, but are not limited to, phenylmethyl(benzyl), 1-phenylethyl, 2-phenylethyl and phenylpropyl.

The terms "alkylaryl" or "$(C_{1-n})$alkylaryl" wherein n is an integer, as used herein and unless specified otherwise, either alone or in combination with another radical, are intended to mean an aryl radical as defined above which is itself substituted with one or more saturated, acyclic alkyl radicals each having 1 to n carbon atoms as defined above. Examples of alkylaryl include, but are not limited to, 2-methylphenyl, 3-methylphenyl, 4-methylphenyl, 2-ethylphenyl, 3-ethylphenyl, 4-ethylphenyl, 2,3-dimethylphenyl, and the like.

Methods for the preparation of the at least one dibasic ester of the present surfactant composition are described in U.S. Patent Application Publication 2009/0281012. For example, the at least one dibasic ester of the present surfactant composition can be prepared from one or more dinitrile precursors, by methods well known in the art. In at least one embodiment, the one or more dinitrile precursors can be a mixture of dinitriles formed in the industrial process for the manufacture of adiponitrile by double hydrocyanation of butadiene. Such a mixture of dinitriles includes at least one of adiponitrile, methylglutaronitrile and ethylsuccinonitrile. In addition, the at least one dibasic ester of the present surfactant composition can be prepared from one or more by-products in the reaction, synthesis and/or production of adipic acid used in the production of polyamide, including but not limited to polyamide 6,6.

In at least one embodiment, the at least one non-ionic surfactant is at least one aliphatic alkoxylated alcohol. In at least one embodiment, the at least one aliphatic alkoxylated alcohol is at least one ethoxylated alcohol of the formula:

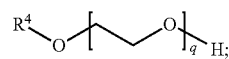

wherein $R^4$ is a $(C_{5-25})$alkyl group which is branched or linear; and q is an integer from 1 to about 30. In at least one embodiment, $R^4$ is a $(C_{5-16})$alkyl group which is branched or linear. In at least one embodiment, $R^4$ is a $(C_{8-13})$alkyl group which is branched or linear. In at least one embodiment, q is an integer from about 2 to about 20. In at least one embodiment, q is an integer from about 3 to about 12. In at least one embodiment, the ethoxylated alcohol is an ethoxylated isodecyl alcohol.

In at least one embodiment, the at least one non-ionic surfactant has an HLB number between about 7 and about 15. As is well understood in the art, the term "HLB number" or "Hydrophile-Lipophile Balance number" is a measure of the hydrophobicity or hydrophilicity of a non-ionic surfactant, or its affinity for water or oil. Surfactants with higher HLB numbers (for example, greater than 10) have a relatively greater affinity for water, and are more hydrophilic, while those with lower HLB numbers (for example, less than 10) have a relatively greater affinity for oil and are more lipophilic.

In at least one embodiment, the at least one terpene is selected from pinene and limonene, including stereoisomers, enantiomers and racemates thereof and mixtures thereof. Pinene includes but is not limited to the structural isomers α-pinene and β-pinene, including stereoisomers, enantiomers and racemates thereof and mixtures thereof. In at least one embodiment, the terpene is α-pinene, β-pinene, (+)-limonene or mixtures thereof. In at least one embodiment, the terpene derivative is a terpene alkoxylate having the formula

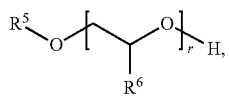

wherein $R^5$ is a terpenyl radical, $R^6$ is independently in each instance H or a $(C_{1-3})$alkyl group, and r is an integer of from about 1 to about 50. In at least one embodiment, $R^5$ is a pinenyl radical or a limonenyl radical. In at least one embodiment, $R^6$ is an α-pinenyl radical, a β-pinenyl radical or a (+)-limonenyl radical. In at least one embodiment, $R^6$ is independently in each instance H or $CH_3$. In at least one embodiment, the terpene alkoxylate is an ethoxyl propoxyl terpene.

In at least one embodiment, the surfactant composition further comprises no more than 5% by weight of a polyalkylene glycol. In at least one embodiment, the polyalkylene glycol is selected from polyethylene glycol and polypropylene glycol. In at least one embodiment, the polyalkylene glycol is polyethylene glycol. In at least one embodiment, when the surfactant composition comprises up to 5% by weight of a polyalkylene glycol, the surfactant composition has a reduced tendency to become cloudy.

In at least one embodiment, the surfactant composition comprises about 30% to about 60% by weight of at least one dibasic ester; about 30% to about 60% by weight of at least one aliphatic ethoxylated alcohol; about 1% to about 15% by weight of at least one terpene; and no more than 5% by weight polyethylene glycol. In at least one embodiment, the surfactant composition comprises about 30% to about 60% by weight of ethoxylated isodecyl alcohol; about 30% to about 60% by weight of at least one dibasic ester selected from one or more of a di($C_{1-6}$)alkyl ethylsuccinate, a di($C_{1-6}$)alkyl methylglutarate, a di($C_{1-6}$)alkyl adipate and mixtures thereof; about 1% to about 15% by weight of at least one terpene selected from pinene, (+)-limonene and mixtures thereof; and no more than 5% by weight polyethylene glycol.

In at least one embodiment, the surfactant composition comprises about 30% to about 60% by weight of at least one dibasic ester; about 30% to about 60% by weight of at least one aliphatic ethoxylated alcohol; about 5% to about 10% by weight of at least one ethoxyl propoxyl terpene; and no more than 5% by weight polyethylene glycol. In at least one embodiment, the surfactant composition comprises about 30% to about 60% by weight of ethoxylated isodecyl alcohol; about 30% to about 60% by weight of dimethyl 2-methylglutarate; about 5% to about 10% by weight of at least one ethoxyl propoxyl terpene; and no more than 5% by weight polyethylene glycol. Suitable surfactant compositions include but are not limited to Rhodiasolv™ Infinity (Rhodia). In at least one embodiment, the present surfactant composition has at least one of the properties of being environmentally friendly, biodegradable, non-toxic, or non-flammable. In at least one embodiment, the surfactant composition has a flash point higher than 140° C.

In at least one embodiment, the surfactant composition is a microemulsion additionally comprising no more than 20% water by volume. In at least one embodiment, the surfactant composition is a microemulsion additionally comprising from about 1% to about 20% water by volume. In at least one embodiment, the surfactant composition additionally comprises from about 2% to about 20% water by volume. In at least one embodiment, the surfactant composition additionally comprises from about 12% to about 20% water by volume. In at least one embodiment, the surfactant composition additionally comprises about 12% water by volume.

In at least one embodiment, when the surfactant composition contains about 30% to about 60% by weight of ethoxylated isodecyl alcohol; about 30% to about 60% by weight of dimethyl 2-methylglutarate; about 5% to about 10% by weight of at least one ethoxyl propoxyl terpene, no more than 5% by weight of polyethylene glycol, and from about 12% to about 20% water by volume, the surfactant composition has a reduced freeze point compared to the surfactant composition containing about 30% to about 60% by weight of ethoxylated isodecyl alcohol; about 30% to about 60% by weight of dimethyl 2-methylglutarate; about 5% to about 10% by weight of at least one ethoxyl propoxyl terpene, no more than 5% by weight of polyethylene glycol, and no more than 1% water by volume. In at least one embodiment, when the surfactant composition contains about 12% water by volume, the freeze point of the surfactant composition is reduced to less than −20° C. or to less than −30° C. Reducing the freeze point of the surfactant composition facilitates the addition of the surfactant composition to the other components on-site during conditions when the ambient temperature is at or below 0° C., since the surfactant composition can remain fluid under such conditions.

The present slickwater fracturing fluid also advantageously contains a proppant. Suitable proppants include but are not limited to sand, ceramic proppants, and others well known to the skilled person. In at least one embodiment, the concentration of proppant in the present slickwater fracturing fluid is from about 20 kg/m³ to about 500 kg/m³.

The present slickwater fracturing fluid is useful for hydraulic fracturing of a subterranean formation by pumping the slickwater fracturing fluid into the formation under conditions well known in the art. In at least one embodiment, the present slickwater fracturing fluid provides an environmentally friendly alternative to existing slickwater fracturing fluids for at least one of the following reasons:

base water containing up to 300,000 ppm of total dissolved solids can be used, allowing for the re-use of water which might otherwise need to be disposed of, including but not limited to flowback water, produced water and recycled water;

components which are potentially toxic or damaging to the environment are avoided; and many of the components of the present slickwater fracturing fluid are biodegradable.

EXAMPLES

Other features of the present invention will become apparent from the following non-limiting examples which illustrate, by way of example, the principles of the invention.

Friction Reduction

Figure 2:
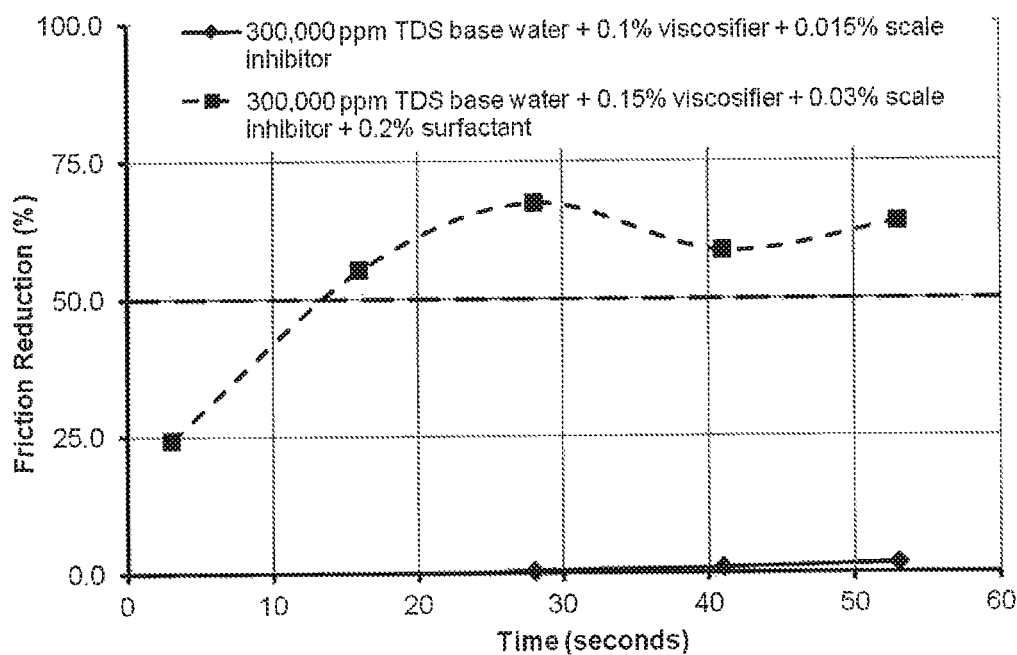
FIG. 2 is a chart showing the friction reduction observed for another embodiment of the present slickwater fracturing fluid containing base water containing 300,000 ppm total dissolved solids (TDS).

Test fluids are prepared by adding a cationic polyacrylamide viscosifier, an anionic polyacrylate scale inhibitor and optionally a surfactant composition as described herein to base water containing either 150,000 ppm or 300,000 ppm total dissolved solids (TDS) in the concentrations shown in Table 1. The components are added on the fly to simulate field pumping conditions. The friction reducing ability of the test fluids is measured in a one pass flow loop apparatus at ambient temperature (20° C.), using a fluid flow rate comparable to that of an average slickwater fracture treatment, as will be clearly understood in the art. Pressure drop measurements are taken at 3, 16, 28, 41 and 53 seconds. The results are shown in Table 1 and graphically in FIG. 1 (fluids containing 150,000 ppm TDS) and FIG. 2 (fluids containing 300,000 ppm TDS).

TABLE 1

| TDS (ppm) | Viscosifier (%) | Scale Inhibitor (%) | Surfactant (%) | Time (s) | Friction Reduction (%) |
|---|---|---|---|---|---|
| 150,000 | 0.1 | 0.015 | 0 | 3 | 1.0 |
|  |  |  |  | 16 | 42.0 |
|  |  |  |  | 28 | 59.6 |
|  |  |  |  | 41 | 56.3 |
|  |  |  |  | 53 | 56.8 |
| 150,000 | 0.1 | 0.015 | 0.1 | 3 | 50.6 |
|  |  |  |  | 16 | 59.9 |
|  |  |  |  | 28 | 70.0 |
|  |  |  |  | 41 | 57.5 |
|  |  |  |  | 53 | 65.3 |
| 300,000 | 0.1 | 0.015 | 0 | 3 | −1.4 |
|  |  |  |  | 16 | −0.7 |
|  |  |  |  | 28 | 0.4 |
|  |  |  |  | 41 | 0.9 |
|  |  |  |  | 53 | 1.7 |
| 300,000 | 0.15 | 0.03 | 0.2 | 3 | 24.2 |
|  |  |  |  | 16 | 55.3 |
|  |  |  |  | 28 | 67.5 |
|  |  |  |  | 41 | 58.8 |
|  |  |  |  | 53 | 64.1 |

The results indicate that test fluids containing the surfactant composition show improved friction reducing ability over comparable test fluids which do not contain the surfactant composition.

The embodiments described herein are intended to be illustrative of the present compositions and methods and are not intended to limit the scope of the present invention. Various modifications and changes consistent with the description as a whole and which are readily apparent to the person of skill in the art are intended to be included. The appended claims should not be limited by the specific embodiments set forth in the examples, but should be given the broadest interpretation consistent with the description as a whole.

What is claimed is:

1. A slickwater fracturing fluid comprising:
   base water comprising up to 300,000 ppm total dissolved solids;
   a viscosifier;
   a scale inhibitor; and
   a surfactant composition, the surfactant composition comprising:
   at least one dibasic ester having a structural formula:

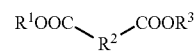

wherein $R^1$ and $R^3$ are each independently selected from $(C_{1-20})$alkyl, $(C_{3-10})$cycloalkyl, aryl, $(C_{1-12})$alkylaryl and aryl$(C_{1-12})$alkyl; and $R^2$ is $-(CH_2)_p-$, wherein p is an integer from 2 to 7, and wherein the $-(CH_2)_p-$ group is optionally substituted with from 1 to 3 $(C_{1-3})$alkyl groups,
   at least one non-ionic surfactant,
   at least one terpene or terpene derivative, and
   optionally at least one polyalkylene glycol.

2. The slickwater fracturing fluid according to claim 1 wherein the viscosifier is a polyacrylamide viscosifier.

3. The slickwater fracturing fluid according to claim 2 wherein the polyacrylamide viscosifier is cationic.

4. The slickwater fracturing fluid according to claim 1, wherein the scale inhibitor is an anionic polyacrylate.

5. The slickwater fracturing fluid according to claim 4, wherein the anionic polyacrylate has a molecular weight of from about 1500 daltons to about 15,000 daltons.

6. The slickwater fracturing fluid according to claim 1, wherein the surfactant composition comprises:
   about 30% to about 60% by weight of at least one dibasic ester;
   about 30% to about 60% by weight of at least one non-ionic surfactant;
   about 1% to about 15% by weight of at least one terpene or terpene derivative;
   no more than about 20% water by volume; and
   no more than 5% by weight of at least one polyalkylene glycol.

7. The slickwater fracturing fluid according to claim 6 wherein the surfactant composition comprises about 12% water by volume.

8. The slickwater fracturing fluid according to claim 6 wherein the at least one dibasic ester is selected from a di$(C_{1-6})$alkyl ethylsuccinate, a di$(C_{1-6})$alkyl methylglutarate, a di$(C_{1-6})$alkyl adipate, and a mixture thereof.

9. The slickwater fracturing fluid according to claim 8 wherein the at least one dibasic ester is dimethyl 2-methylglutarate.

10. The slickwater fracturing fluid according to claim 6 wherein the at least one non-ionic surfactant is at least one aliphatic alkoxylated alcohol.

11. The slickwater fracturing fluid according to claim 10 wherein the at least one aliphatic alkoxylated alcohol is ethoxylated isodecyl alcohol having a Hydrophile-Lipophile Balance (HLB) number between about 7 and about 15.

12. The slickwater fracturing fluid according to claim 6 wherein the at least one terpene or terpene derivative is selected from pinene and limonene.

13. The slickwater fracturing fluid according to claim 6 wherein the at least one terpene or terpene derivative is an ethoxyl propoxyl terpene.

14. The slickwater fracturing fluid according to claim 6 wherein the at least one polyalkylene glycol is polyethylene glycol.

15. The slickwater fracturing fluid according to claim 1 comprising from about 0.02% to about 0.5% by volume of the viscosifier; from about 0.01% to about 0.5% by volume of the scale inhibitor and from about 0.05% to about 0.5% by volume of the surfactant composition.

16. The slickwater fracturing fluid according to claim 1 further comprising a proppant.

17. The slickwater fracturing fluid according to claim 16 wherein the concentration of the proppant is from about 20 $kg/m^3$ to about 500 $kg/m^3$.

18. A method of fracturing a subterranean formation comprising pumping a slickwater fracturing fluid according to claim 1 into the subterranean formation.

* * * * *